Nov. 27, 1945.  L. DEDDO  2,389,899
BUILDING STRUCTURE
Filed May 31, 1943
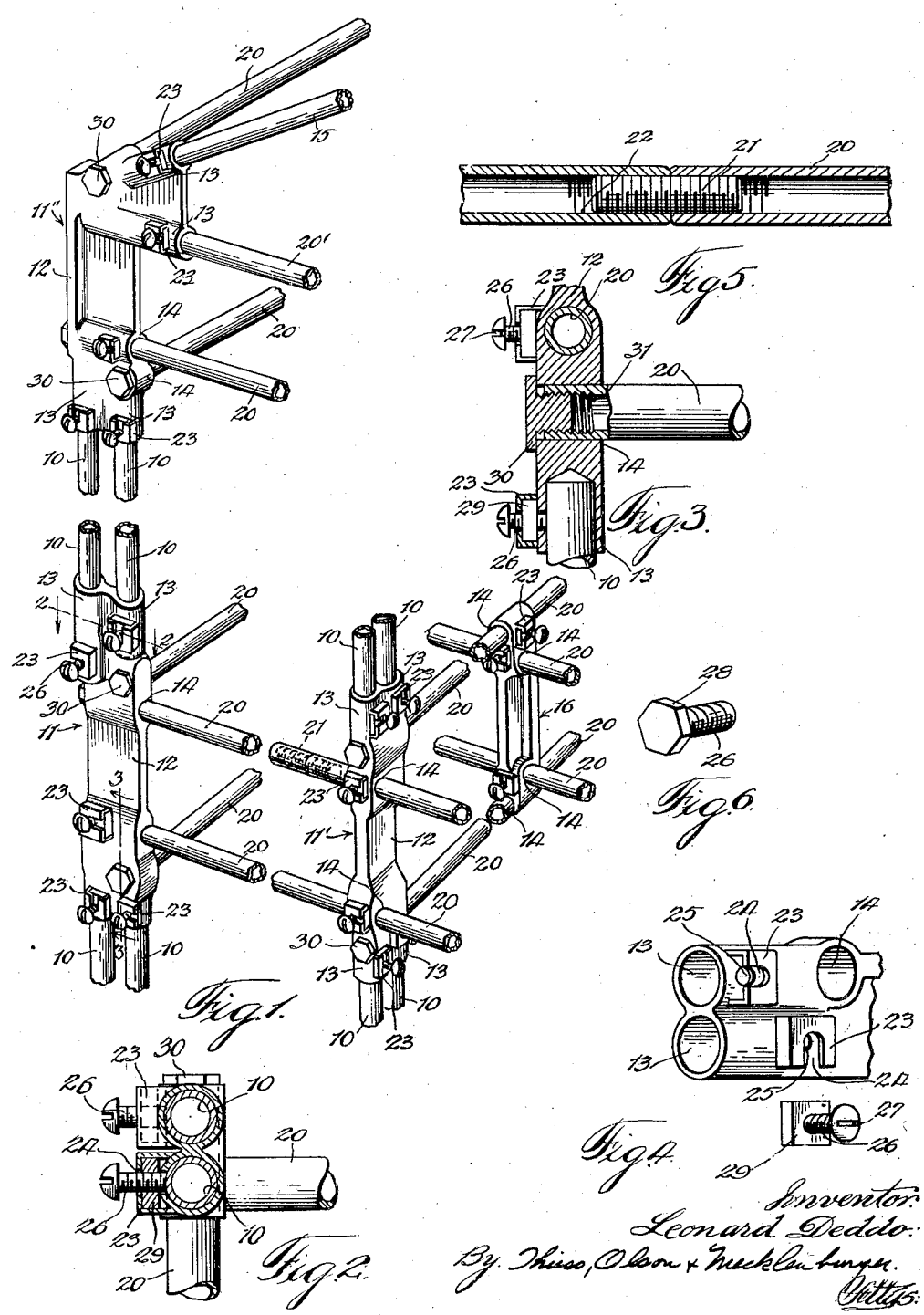
Inventor:
Leonard Deddo
By Thiess, Olson & Mecklenburger
Attys.

Patented Nov. 27, 1945

2,389,899

UNITED STATES PATENT OFFICE 2,389,899

BUILDING STRUCTURE

Leonard Deddo, Chicago, Ill.

Application May 31, 1943, Serial No. 489,138

9 Claims. (Cl. 189—1)

The present invention relates to an improved building structure, and particularly to the connectors employed in the erection thereof.

The building structure of the present invention consists of a series of elongated structural elements which may consist of pipe or other cylindrical elements, but which is not limited thereto, in combination with certain special fittings and connectors by means of which the structural elements may be assembled, drawn up and locked into a rigid structure which may form the frame work of a building, a bridge, shed, etc.

It has already been proposed to produce frameworks such as for scaffolds, temporary buildings, permanent buildings, houses, poles, bridges, etc., by employing elongated elements such as angle irons, T beams, I beams, rods, pipe, and the like, connected together by means of special fittings, but in most cases the fittings had to be very numerous and in almost all instances had to be provided with either external or internal threads, or both, to permit the structural elements, for example pipe, to be assembled therewith.

This of course necessitates the use either of unions or the presence of both right-handed and left-handed threads so that when, for example, a length of pipe was inserted into two connectors located at opposite ends thereof, it was obviously necessary to provide one end of the pipe with a right-hand thread and the other with a left-hand thread. Also the fittings had to have left- and right-handed threads. The result of this was that the number of fittings required was very great, and that it was necessary to make sets of both right- and left-handed and obverse and reverse fittings in order to meet the various conditions about the building structure.

Moreover, it became very essential in erecting the structure to follow a certain predetermined sequence, as otherwise the insertion of an element might become impossible by reason of the previous insertion of another one.

These difficulties are substantially avoided by the construction of the present invention which consists primarily of, for example, pipe, lengths or sections of which are connected together by a number of special connectors which are provided with apertures or openings into which the pipe may be inserted or through which it may pass. The use of threads in the pipe is almost entirely avoided, and also the connectors do not have threads thereon. Instead, the connectors are provided on their outer sides with nut-holding receptacles or pockets in which nuts may be inserted by being slid in sidewardly, the pockets being of such configuration as to resist the turning of the nuts. Suitable screw members which may be either screw headed, or provided with the usual flanges, engage these nuts and pass through holes into the openings into which the pipe has either been inserted or pushed clear through, whereby, upon tightening of the threaded elements, the pipe will be pushed against the walls of the opening, while at the same time the flat sides of the nut will be pushed against the corresponding flat side of the pockets, thereby locking the pipe in place. Additionally, if desired, the ends of the pipes may be provided with either internal or external threads which engage suitably threaded fastening means, by means of which the terminals of the pipes may be snugly drawn into the openings and the entire structure thereby drawn together into a strong, secure and substantial frame-work. Means are also provided for properly spacing the supports which are employed for supporting floors and roofs, and means are also provided to take care of angular adjustments such as are necessary to obtain the proper pitch, say for example in the roof of the structure. Furthermore, the construction also provides for the formation, between the floors and ceilings, of a substantially unobstructed space in which utilities such as plumbing, electrical wiring, heating-ducts, etc., may be placed.

While the present invention will be described primarily in connection with the use of pipes or rods, it is to be understood as being within the intent of the inventor to employ the structure with elongated building elements which have other than a circular cross section, and that the use of the structure as a building frame is merely illustrative.

For a better understanding of the present invention, the same is illustrated in the accompanying sheet of drawings, in which Fig. 1 is a perspective view of the corner of a structure built up from the units and connectors which form the preferred embodiment of the present invention;

Fig. 2 is a cross section, on an enlarged scale, taken along the line 2—2 of Fig. 1;

Fig. 3 is a section along the line 3—3 of Fig. 1, on about the same scale as Fig. 2;

Fig. 4 is a perspective view of one of the connectors and the therewith cooperating bolt shown in an exploded fashion;

Fig. 5, which is an enlargement on about the same scale as Figs. 2 and 3, is a section through two pieces of pipe internally threaded and connected by an externally threaded connector, and Fig. 6 is a perspective view of a bolt which may take the place of the screws illustrated in other figures of the drawing.

Referring to Fig. 1, there is shown therein a series of vertical members (shown in the form of pipes) 10. The bottom part of the lowermost pipes 10 may be suitably embedded in, or otherwise secured to, the foundation of the building. Connectors, broadly designated by the numerals 11, 11' and 11", consist of body portions 12, terminal sockets 13 and apertures 14. As illustrated, the vertical pipes 10 and the angularly disposed roof-supporting pipe 15 are inserted into the sockets 13, while the horizontally disposed pipes 20 are inserted into the apertures 14, with the exception of the horizontal attic-forming pipe 20', which is shown as being fitted into the socket 13 of the roof connecting member 11", shown in the upper left-hand corner of the drawing. There are also provided connectors broadly designated as 16, which instead of containing both sockets and apertures, contain only completely-therethrough-extending apertures 14 through which pipes 20 may be passed or into which they may extend. In order to provide for pipes greater than the normal length of those obtainable on the market, means 21 may be provided, consisting of a solid externally threaded member 21 which engages suitable threads 22 on the inside of the pipe-sections 20, a detail of this structure being shown in Fig. 5, and also indicated in dotted lines in Fig. 1. This type of connection has the further advantage that sections of pipe thus connected can be pushed through the apertures 14 without interference by the joint; or that connectors already in engagement with the pipes may be moved relative to the pipe, even if it be necessary to pass over a joint.

At suitable locations on the outside of the connecting members 11, 11', 11" and 16, and opposite the sockets and apertures 13 and properly positioned relative to said apertures 14, there are located nut-containing pockets 23 which preferably are provided with laterally open slots 24, while the body member is provided with holes 25 through which may pass suitably threaded fastening members 26, shown for purposes of illustration as consisting of screws which are provided with the usual type of head having a slot 27. It is to be understood, however, that instead of having slotted heads, the screws 26, as shown in Fig. 6, may have for example hexagonal heads 28. The heads of course may be square or octagonal or any other shape adapted for engagement by a wrench or other tool.

To secure, for example, the pipes 10 and 20, which are inserted into either the sockets 13 or the apertures 14, a suitable nut 29 may have threaded thereinto the threaded screw or bolt member 26, whereafter the nut is pushed laterally into the nut-receiving pocket 23, and the threaded member 26 is turned so as to drive the shank thereof through the nut 29, and through the hole 25, so that it will impinge against the pipe 10 or 20 fitted in the apertures 14 or sockets 13. The result will be that the shaft of the threaded fastening member 26 will pass through the opening 25 and will bear against the adjacent pipe while at the same time the nut 29 will be forced against the outer wall of the pocket 23, with the result that the pipe will be securely held within either the socket 13 or the aperture 14. In order to obtain still greater rigidity, and also for the purpose of drawing the structure tightly together, the structural members 20, for example, may be suitably threaded, either internally or externally, and after being pushed into the apertures 14, may have attached thereto suitably threaded tightening members 30 which are illustrated as consisting of plugs 30, the pipes 20 being internally threaded at 31 and the threads of the plugs 30 engaging therewith. Inasmuch as the flanged ends of the plugs 30 are larger than the apertures 14, it is thus possible tightly to draw the structure together. However, the pipes may be externally threaded and flanged caps may be used in place of the plugs 30 or the pipes may be externally threaded and allowed to extend a small distance beyond the connectors 11 or 16, and suitable nuts may then be placed upon the pipes to effect a similar action.

In order to provide intermediate spacing supports for the pipes 20, it is preferable to employ connectors 16 (see Fig. 1), which have apertures extending therethrough at right angles to each other as shown, and through which pipes may be passed either entirely therethrough or thereinto, as illustrated.

These members 16 may, for example, be of such a size that they will allow a sufficient space between the different floors of the structure, the upper pipes 20 serving to support the floor of the second story, while the lower pipes 20 serve as a means for suspending the ceiling of the room below. There is thus provided a sufficient space free of obstructing pipes through which the usual service means, as electrical wiring and plumbing, may be passed. Structurally, however, the connectors 11 and 11" and connectors 16 are similar except that the former have the terminal sockets 13 while the connectors 16 are devoid of these.

By referring to Fig. 4, the method of inserting the nut 29 and the screw 26 into the nut-holding pocket 23, and the insertion of the fastening member 26 through the hole 25 can best be understood.

The present structure is particularly useful for the rapid erection of buildings from standard pipe or rod by means of connectors which can be produced in a simple operation by casting or die-casting, and where, by the use of ordinary commercially obtainable nuts and screws, or bolts, the entire structure can be readily erected, without the necessity of specially threaded fittings. This represents a great advance over pipe frame-work structures which have hitherto been proposed, and obviates the necessity for the use of left-handed and right-handed threaded pipe and correspondingly internally threaded fittings.

It will be self-evident that instead of pipe, rods may be used. Internally hollow pipe, however, presents many advantages, particularly by reason of the fact that it enables connections to be made as shown by Figs. 1 and 5, and also that it permits the use of the tightening means consisting of, for example, the plug 30 shown in Fig. 3.

By the use of connectors 11, 11' and 11", a building frame can be readily built up, using only standard pipes or rods, and standard nuts, bolts and screws. By using the connectors 16, space between the floors can be provided, and as these are slidable on the horizontally extending pipes, considerable latitude in construction can be achieved. Moreover, changes in the construction can be made even after a considerable portion of the structure has already been erected.

Modifications within the skill of the constructional engineer and builder are to be considered as within the scope and intent of the present invention for which the inventor claims:

1. In a building structure the combination with elongated structural elements of connectors therefor comprising a body portion having structural-element-receiving apertures therein, and nut-receiving laterally open pockets on the outside of said body portion, said body portion being provided with holes to permit screws engaging laterally insertable nuts housed in said pockets to penetrate into said apertures to engage structural elements therein, a wall of each pocket being engageable by the nut for holding it against movement away from the structural elements, said wall having an opening through which the shank of the screw extends.

2. A building frame comprising elongated cylindrical structural elements connected with each other by connectors having apertures therein into which said elements may be fitted, said connectors having external apertured nut-receiving laterally open pockets and holes connecting said pockets with said first mentioned apertures, screws in engagement with laterally insertable nuts housed in said pockets and passing through said holes and said apertures in said pockets and forcing said structural elements against the walls of said first mentioned apertures, a wall of each pocket being engageable by the nut for holding it against movement away from the structural elements.

3. In a building structure the combination with elongated structural elements of connectors therefor comprising a body portion having structural-element-receiving apertures therein, and slotted laterally open nut-receiving pockets on the outside of said body portion, said body portion being provided with holes registering with the slots in said pockets to permit screws slipped sidewise into said slots engaging laterally insertable nuts housed in said pockets to penetrate into said apertures to secure the structural elements therein, a wall of each pocket being engageable by the nut for holding it against movement away from the structural elements.

4. In a building structure the combination with cylindrical structural elements of connectors therefor comprising a body portion having cylindrical structural-element-receiving apertures therein, and laterally open nut-receiving pockets on the outside of said body portion, said pockets having screw-receiving openings on the outside walls thereof and said body portion having holes in registry with said screw-receiving openings to permit screws engaging laterally insertable nuts housed in said pockets to penetrate into said structural-element-receiving apertures to secure the structural elements therein, a wall of each pocket being engageable by the nut for holding it against movement away from the structural elements.

5. A building structure comprising vertically and angularly disposed elongated structural elements connected with each other by means of connectors which latter comprise body portions and apertures therein containing said elements, laterally open nut-receiving pockets on the outside of said body portions and screws engaging laterally insertable nuts in said pockets and passing through openings in said pockets and in said body portions to secure said structural elements against movement, a wall of each pocket being engageable by the nut for holding it against movement away from the structural elements.

6. A connector for the structural elements of a building structure comprising a body portion having structural-element-receiving apertures therein and apertured laterally open nut-receiving pockets on the outside of said body portion, said body portion being provided with holes in registry with the apertures in said pockets, a wall of each pocket being engageable by the nut for holding it against movement away from the structural elements.

7. A connector for the structural elements of a building structure comprising a body portion having structural-element-receiving apertures and sockets therein, apertured laterally open nut-receiving pockets on the outside of said body portion, said body portion being provided with holes in registry with the apertures in said pockets to permit passage of a screw, a wall of each pocket being engageable by the nut for holding it against movement away from the structural elements.

8. A connector for connecting elongated structural elements comprising a connecting element having an aperture into which an elongated structural element may be fitted, said connecting element having a laterally open nut-receiving and retaining pocket into which a laterally insertable nut may be inserted and held against rotation by the walls of said pocket, said connecting element having clearance to enable a screw to be inserted and threaded through said nut and brought into engagement with the structural element to exert force tending to move the nut away from the structural element into engagement with the wall of the pocket and to force the structural element against a wall of said aperture, a wall of said pocket being engageable by the nut for holding it against movement away from the structural element, said wall having an opening through which the shank of the screw extends.

9. A building frame comprising the combination of pipe-like structural members connected to each other by connectors comprising a body portion having cylindrical openings therein into which said members are fitted, tightening means on said body portions consisting of rectangular slotted nut-retaining pockets open on one side to permit the lateral insertion of nuts, and screw fastening devices engaging the threads of said nuts and passing through said slots in said pockets and said holes in said body portion to impinge against the members fitted therein and to force the nuts against the slotted wall of each pocket, a wall of each pocket being engageable by the nut for holding it against movement away from the structural elements.

LEONARD DEDDO.